United States Patent
Uehara et al.

(10) Patent No.: US 12,393,695 B2
(45) Date of Patent: Aug. 19, 2025

(54) INFORMATION PROCESSING APPARATUS, INFORMATION PROCESSING METHOD, AND NON-TRANSITORY COMPUTER READABLE MEDIUM

(71) Applicant: KABUSHIKI KAISHA TOSHIBA, Tokyo (JP)

(72) Inventors: Tatsuya Uehara, Kanagawa (JP); Jun Kanai, Tokyo (JP); Ryuiti Koike, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 160 days.

(21) Appl. No.: 18/175,728

(22) Filed: Feb. 28, 2023

(65) Prior Publication Data
US 2024/0095371 A1 Mar. 21, 2024

(30) Foreign Application Priority Data
Sep. 15, 2022 (JP) .................. 2022-147083

(51) Int. Cl.
  *G06F 21/00* (2013.01)
  *G06F 21/54* (2013.01)
  *G06F 21/57* (2013.01)

(52) U.S. Cl.
  CPC ............ *G06F 21/577* (2013.01); *G06F 21/54* (2013.01)

(58) Field of Classification Search
  CPC ...... G06F 21/577; G06F 21/54; G06F 21/554; G06F 2221/033; H04L 63/1433
  See application file for complete search history.

(56) References Cited

U.S. PATENT DOCUMENTS 7,739,722 B2   6/2010 Okajo et al.
2006/0265324 A1* 11/2006 Leclerc ............... H04L 63/1433
                                          705/38
(Continued)

FOREIGN PATENT DOCUMENTS

JP    2005-293267 A    10/2005
JP    2007-58514 A     3/2007
(Continued)

OTHER PUBLICATIONS

Japan Patent Office, Office Action in JP App. No. 2022-147063 (May 20, 2025).

*Primary Examiner* — Yogesh Paliwal
(74) *Attorney, Agent, or Firm* — Finnegan, Henderson, Farabow, Garrett & Dunner, LLP

(57) ABSTRACT

An information processing apparatus according to one embodiment, includes: a vulnerability database storing vulnerability information including a vulnerability identifier for uniquely specifying vulnerability, a software identifier for uniquely specifying software including the vulnerability, and vulnerability description indicating content of the vulnerability; a matching processor to specify, in the vulnerability database, vulnerability information matching a software identifier of a target software provided in target equipment; a causal component specifier to specify, from the vulnerability description in the vulnerability information specified by the matching processor, a causal component that is a cause of the vulnerability; a type determiner to determine a type of the causal component from a name of the specified causal component; and an output processor to determine, based on the software identifier of the target software and the type of the causal component, an investigation procedure concerning vulnerability of the target soft- (Continued)

ware and output information indicating the investigation procedure.

10 Claims, 17 Drawing Sheets

(56) References Cited

U.S. PATENT DOCUMENTS

| | | | | |
|---|---|---|---|---|
| 2014/0173737 A1* | 6/2014 | Toback | ............... | G06F 21/57 726/25 |
| 2014/0244679 A1* | 8/2014 | Fedorenko | ............ | G06F 16/40 707/758 |
| 2020/0259856 A1* | 8/2020 | Lukiyan | ............ | H04L 63/1416 |

FOREIGN PATENT DOCUMENTS

| | | |
|---|---|---|
| JP | 2009-48652 A | 3/2009 |
| JP | 4751431 B2 | 8/2011 |
| JP | 2020-21309 A | 2/2020 |
| JP | 7008893 B2 | 1/2022 |

\* cited by examiner

| VULNERABILITY ID | SOFTWARE NAME | VERSION CONDITION | SOFTWARE IDENTIFIER | VULNERABILITY CONTENT | SERIOUSNESS DEGREE | VULNERABILITY TYPE | REGISTRATION DATE AND TIME |
|---|---|---|---|---|---|---|---|
| 00001 | aaaOS | EARLIER THAN 5.0.6 | cpe:/o:mmm:aaa: | Since an aaa OS has a defect in a DAB service, vulnerability of promoting authority is present in the aaa OS. | 8.5 | AUTHORITY PROMOTION | 2022/05/01 10:00:02 |
| 00002 | aaaOS | EARLIER THAN 5.0.5 | cpe:/o:mmm:aaa: | Vulnerability is present in a password management service of the aaa OS. | 7.0 | BUFFER OVERRUN | 2022/04/22 09:55:23 |
| ⋮ | ⋮ | ⋮ | ⋮ | ⋮ | ⋮ | ⋮ | ⋮ |

FIG. 2

|  | COLLATION PATTERN | CAUSAL COMPONENT | COMPONENT TYPE |
|---|---|---|---|
| EXTRACTION RULE1 | .* has a defect in [,]?[in ^]* | $1 | * |
| EXTRACTION RULE2 | Has a defect in a driver of ([of ^]*) | $1 | driver |
| . . . | . . . | . . . | . . . |

FIG. 3

|  | COLLATION PATTERN | STANDARD NAME | COMPONENT TYPE |
|---|---|---|---|
| DETERMINATION RULE1 | (.*) driver | $1 | driver |
| DETERMINATION RULE2 | (.*) driver? | $1 | driver |
| DETERMINATION RULE3 | (.*) service | $1 | service |
| DETERMINATION RULE4 | (.*) service | $1 | service |
| DETERMINATION RULE5 | CCC DDDD | DDDD | function |
| . . . | . . . | . . . | . . . |

FIG. 4

| VULNERABILITY ID | STANDARD NAME | COMPONENT TYPE |
|---|---|---|
| 00001 | DAB | service |
| 00002 | pms | service |
| ... | ... | ... |

FIG. 5

| CONFIGURATION NUMBER | LOADING EQUIPMENT NAME | SOFTWARE NAME | VERSION | SOFTWARE IDENTIFIER | CHECK DATE AND TIME |
|---|---|---|---|---|---|
| 00001 | XXX01 | aaa OS | 5.0.1 | cpe:/o:mmm:aaa: | 2022/04/22 12:34:56 |
| 00002 | XXX01 | bbb | 1.2.3 | cpe:/o:mmm:aaa: | 2022/04/22 12:34:57 |
| ... | ... | ... | ... | ... | ... |

FIG. 6

| COMPONENT TYPE | SOFTWARE IDENTIFIER | INVESTIGATION PROCEDURE |
|---|---|---|
| service | cpe:/o:mmm:aaa: | You log in to an investigation target and execute a command "Get-Service". When [component] is absent in an output of the investigation target, it is determined that security is high. Alternatively, when [component] is present and when a start mode is "Auto" or "Enable", it is determined that security is low. When the start mode is other than "Auto" and "Enable", it is determined that security is high. |
| driver | cpe:/o:mmm:aaa: | You log in to an investigation target and execute a command "Get-Driver". When [component] is absent in an output of the investigation target, it is determined that security is high. Alternatively, when [component] is present and when a state is "LOAD", it is determined that security is low. When the start mode is other than "LOAD", it is determined that security is high. |
| ... | ... | ... |

FIG. 7

PRODUCT    Vulnerability is likely to be present in equipment "XXX01".

VULNERABILITY: Since an aaa OS has a defect in a DAB service, vulnerability of promoting authority is present in the aaa OS.

INVESTIGATION PROCEDURE: You log in to an investigation target and execute a command "Get-Service". When [component] is absent in an output of the investigation target, it is determined that security is high. Alternatively, when [component] is present and when a start mode is "Auto" or "Enable", it is determined that security is low. When the start mode is other than "Auto" and "Enable", it is determined that security is high.

FIG. 8

PRODUCT     Vulnerability is likely to be present in equipment "XXX01".

VULNERABILITY: Since an aaa OS has a defect in a DAB service, vulnerability of promoting authority is present in the aaa OS.

Please examine the influence of the vulnerability.

FIG. 9

| CONFIGURATION NUMBER | COMPONENT TYPE | SETTING IDENTIFIER | SETTING VALUE |
|---|---|---|---|
| 00001 | service | DAB | ON |
| 00001 | service | abcd | OFF |
| 00001 | driver | kbd | ON |
| 00001 | driver | display | ON |
| 00003 | kernel | NEW_FILE_SYSTEM | 1 |
| . . . | . . . | . . . | . . . |

FIG. 13

| COMPONENT TYPE | SETTING IDENTIFIER | SETTING VALUE |
|---|---|---|
| service | SERVICE NAME | "ON" when the service is started/otherwise, "OFF" |
| driver | DRIVER NAME | "ON" when the driver is loaded/otherwise, "OFF" |
| function | FUNCTION NAME OF OS | "enable" when the function is enabled/otherwise, "disable" |
| kernel | SETTING ITEM OF SETTING FILE | A value set in the setting item (can take any value other than 0) |

FIG. 14

ABSTRACT# INFORMATION PROCESSING APPARATUS, INFORMATION PROCESSING METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2022-147083, filed on Sep. 15, 2022, the entire contents of which are incorporated herein by reference.

FIELD

Embodiments described herein relate to an information processing apparatus, an information processing method, and a non-transitory computer readable medium.

BACKGROUND

Software such as an OS (Operating System) is loaded on various systems and products in which computers are used. The software is configured from a large number of components. In those kinds of software, even if vulnerability is not found at a system construction time or a product development time, various vulnerabilities are likely to be found as time elapses. Therefore, even after the system construction or product shipment, a manufacturer (a user) of the system or the product needs to check whether vulnerability is included in software loaded on the system or the product.

In order to make vulnerability known to all, there is a site that collects and discloses information concerning found vulnerability (vulnerability information). Therefore, it is possible to automatically detect vulnerability by extracting, in advance, information concerning software included in an inspection target system and collating the information concerning the software with information concerning the software described in the disclosed vulnerability information.

However, when presence or absence of vulnerability is determined only according to whether specific software is included in an inspection target system or product, a large number of pieces of unimportant vulnerability information correspond to the vulnerability. For example, among components included in an OS, which is software, a lot of components not in use are also present. Even if such components have vulnerability, security is considered to be relatively high. A user needs to specify, from detected vulnerability, a component causing the vulnerability (a causal component) and determine, for each piece of vulnerability information, whether the causal component is effective in a target system or product.

BRIEF DESCRIPTION OF THE DRAWINGS

FIG. 2 is a diagram showing an example of vulnerability information;

FIG. 3 is a diagram showing an example of extraction rules;

FIG. 4 is a diagram showing an example of determination rules;

FIG. 5 is a diagram showing an example of causal component information;

FIG. 6 is a diagram showing an example of configuration information;

FIG. 7 is a diagram showing an example of investigation procedure information;

FIG. 8 is a diagram showing an example of vulnerability investigation information output by an output processor;

FIG. 9 is a diagram showing another example of the vulnerability investigation information output by the output processor;

FIG. 13 is a diagram showing an example of setting information;

FIG. 14 is a diagram showing an example of a relation between a setting identifier and a setting value for each of component types;

DETAILED DESCRIPTION

According to one embodiment, an information processing apparatus includes: a vulnerability database in which one or more pieces of vulnerability information are stored, the vulnerability including
    a vulnerability identifier for uniquely specifying vulnerability,
    a software identifier for uniquely specifying software including the vulnerability, and
    vulnerability description indicating content of the vulnerability;
    a matching processor configured to specify, in the vulnerability database, vulnerability information matching a software identifier of a target software provided in target equipment;
    a causal component specifier configured to specify, from the vulnerability description in the vulnerability information specified by the matching processor, a causal component that is a cause of the vulnerability;
    a type determiner configured to determine a type of the causal component from a name of the specified causal component; and
    an output processor configured to determine, based on the software identifier of the target software and the type of the causal component, an investigation procedure concerning vulnerability of the target software and output information indicating the investigation procedure.

Embodiments of the present invention are explained below with reference to the drawings. Software and commands referred to in the following explanation are fictional. Commands in use and the like are different for each kind of software and need to be changed as appropriate.

First Embodiment

Figure 1:
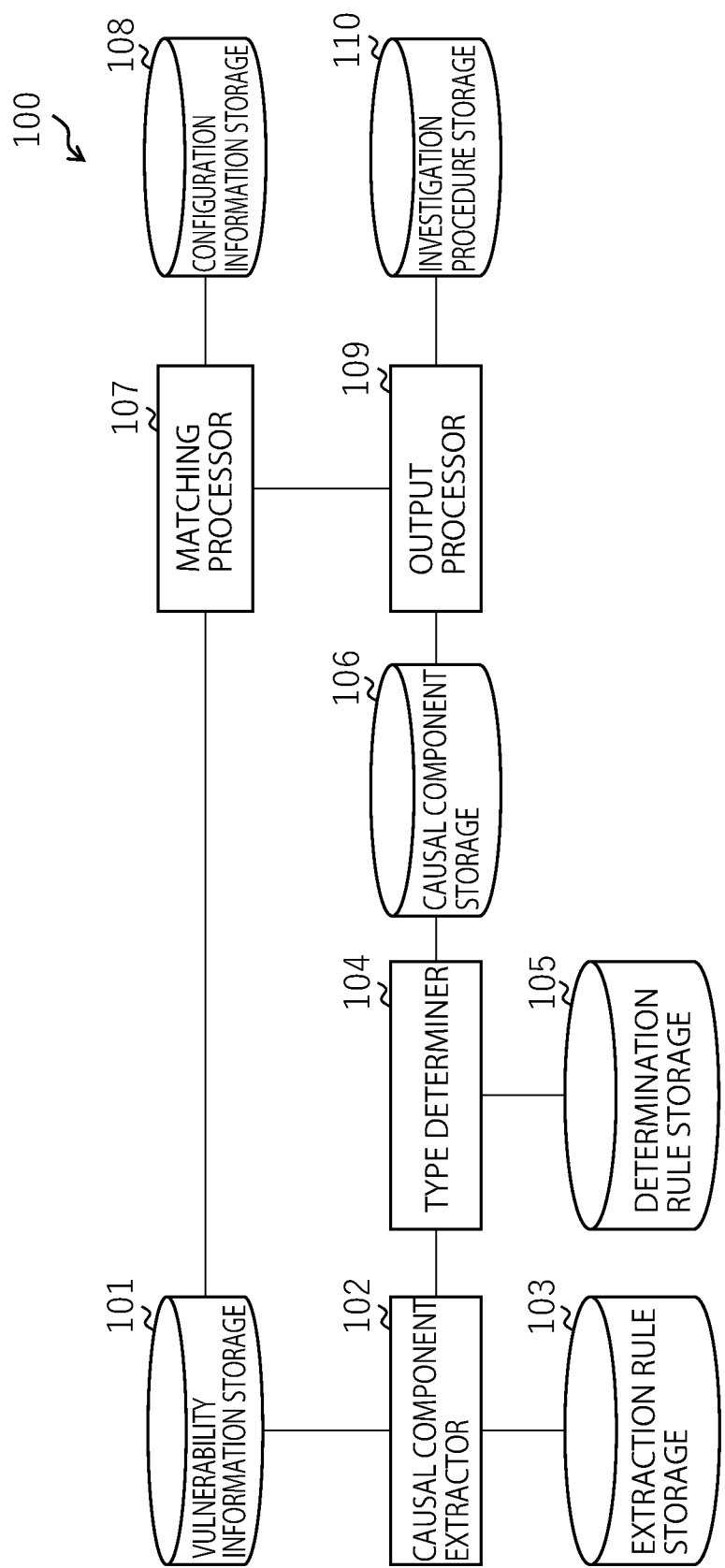
FIG. 1 is a block diagram showing an information processing apparatus according to a first embodiment.

FIG. 1 is a block diagram of an information processing apparatus 100 according to a first embodiment. The information processing apparatus 100 specifies, from disclosed vulnerability information, a component causing vulnerability (a causal component) (a first phase) and determines whether vulnerability is included in a system or a product that is a vulnerability investigation target (a second phase).

The information processing apparatus 100 includes a vulnerability information storage 101, a causal component extractor (a causal component specifier) 102, an extraction rule storage 103, a type determiner 104, a determination rule storage 105, a causal component storage 106, a matching processor 107, a configuration information storage 108, a vulnerability investigation procedure output processor 109, and an investigation procedure storage 110.

The storages 103, 105, 106, 108, and 110 are configured by a storage medium such as a RAM (Random Access Memory), a flash memory, or a hard disk. The blocks 101, 102, 104, 107, and 109 can be configured by a processor or a circuit such as a CPU, an MPU, or an ASIC. In the following explanation, the information processing apparatus 100 is explained in detail.

The vulnerability information storage 101 stores vulnerability information of software. An OS (Operating System) is assumed as the software in this embodiment. However, the software is not limited to the OS. There is Windows (registered trademark) as an example of the OS. However, the OS may be another OS. The vulnerability information storage 101 may store vulnerability information acquired through the Internet from a disclosed vulnerability information site such as an NVD (National Vulnerability Database) or may store vulnerability information acquired via a storage medium such as a CD-ROM.

FIG. 2 shows an example of the vulnerability information of the software stored in the vulnerability information storage 101. As shown in FIG. 2, the vulnerability information includes items of "vulnerability ID (vulnerability identifier)", "software name", "version condition", "software identifier", "vulnerability content" (vulnerability description), "seriousness degree", "vulnerability type", and "registration date and time".

The "vulnerability ID", is an identifier added to the vulnerability information. One vulnerability ID is linked to one piece of vulnerability information. The vulnerability ID may be an original identifier or a common vulnerability identifier (CVE: Common Vulnerabilities and Exposures) may be used as the vulnerability ID.

The "software name" indicates a name of software in which vulnerability indicated by the vulnerability information is detected.

The "version condition" indicates a range of versions in which the vulnerability is present of the software in which vulnerability is detected. The "version condition" may be a version in which vulnerability is present or may be a range of versions (for example, "earlier than 5.0.6") in which vulnerability is present.

The "software identifier" indicates an identifier of the software. In this embodiment, CPE (Common Platform Enumeration) specified by the NIST (National Institute of Standards and Technology) is used as the identifier of the software. However, another identifier may be used. When the software can be uniquely identified by a name of the software, the name of the software can also be used as the software identifier.

The "vulnerability content" indicates content of target vulnerability information. For example, the vulnerability content includes a type of the vulnerability, a target, and a cause. The vulnerability content is described in a natural language.

The "seriousness degree" indicates an influence degree of target vulnerability. For example, a CVSS (Common Vulnerability Scoring System) is used for the seriousness degree.

The "vulnerability type" indicates a type of the target vulnerability. For the vulnerability type, for example, CWE (Common Weakness Enumeration) may be used or an originally specified classification may be used.

The "registration date and time" indicates a date and time when the vulnerability information is registered (stored) in the vulnerability information storage 101.

The causal component extractor 102 extracts (specifies), using extraction rules, a causal component of the vulnerability from the vulnerability information stored in the vulnerability information storage 101. The causal component extractor 102 outputs the extracted causal component to the type determiner 104 together with the vulnerability information.

In order to prevent the same processing from being repeated concerning the first phase, the causal component extractor 102 stores an execution date and time at the last first phase and compares the execution date and time with the registration date and time included in the vulnerability information. When a registration date and time included in certain vulnerability information is earlier than the execution date and time at the last first phase, since the vulnerability information has already been processed in the last first phase, another piece of vulnerability information is selected.

When the seriousness degree included in the vulnerability information is smaller than a predetermined threshold, the causal component extractor 102 may not set the vulnerability information as a processing target. Consequently, it is possible to reduce the number of vulnerabilities to be finally notified to a user. Therefore, it is possible to reduce a burden on the user.

The extraction rule storage 103 stores extraction rules.

An example of the extraction rules stored in the extraction rule storage 103 is shown in FIG. 3. The extraction rules include, for example, items of "collation pattern" (a first collation pattern), "causal component", and "component type".

The "collation pattern" indicates a pattern for extracting a causal component from the vulnerability content of the vulnerability information. The collation pattern is described using, for example, a regular expression. Since the vulnerability content of the vulnerability information is not always described in a fixed form, the collation pattern is desirably described in all possible patterns.

The "causal component" indicates, when the collation pattern matches certain vulnerability content, a portion representing a causal component in the vulnerability content. When the causal component is indicated as "$n" (n=1, 2, 3 . . . ), the causal component indicates an n-th component from the beginning in a portion surrounded by round brackets included in the collation pattern.

The "component type" indicates a type of the extracted causal component. The component type is given to the causal component in order to specify an investigation procedure explained below.

When the component type is "*", this indicates that the component type cannot be determined depending on the extraction rules. In this embodiment, the following four types are assumed as the component type. This is because the OS is assumed as the software in this embodiment. Component types are not limited to these types. For example, a specific application may be designated as a component type.

service: the causal component is a service process driver: the causal component is a driver of the OS function: the causal component is an extension function of the OS kernel: the causal component is a compile option of a kernel The extraction rules stored in the extraction rule storage 103 may be updated based on, for example, the vulnerability information on the vulnerability information site. Alternatively, new extraction rules may be manually added by the user.

For example, it is assumed that the causal component extractor 102 extracts, using an extraction rule 1 shown in FIG. 3, the causal component of the vulnerability shown in FIG. 2.

The causal component extractor 102 acquires one piece of unprocessed vulnerability information stored in the vulnerability information storage 101. As an example, it is assumed that vulnerability information with a vulnerability ID: 00001 (hereinafter referred to as vulnerability information A) is acquired (see FIG. 2).

The causal component extractor 102 acquires one of the extraction rules stored in the extraction rule storage 103 and performs matching with vulnerability content of the acquired vulnerability information A. When the matching is unsuccessful, the causal component extractor 102 acquires unselected (unmatched) another extraction rule and performs the matching again. Unselected means that an extraction rule is unselected for the vulnerability information A.

In the case of the vulnerability information A, the vulnerability content of the vulnerability information A matches a collation pattern of the extraction rule 1 (see FIG. 3). "DAB service" corresponds to a portion surrounded by round brackets of the collation pattern of the extraction rule 1. Since the "causal component" of the extraction rule 1 is "$1", the "DAB service" is extracted as the causal component. A component type of the extracted "DAB service" is unknown at this point in time. In order to determine the component type of the "DAB service", it is necessary to use determination rules. This is why the "component type" of the extraction rule 1 is "*".

For example, when an extraction rule 2 is used, since a collation pattern is "(a defect is present in a driver of [of^]*), at a point in time when vulnerability content matches the collation pattern, it is decided that a defect is present in a driver of an extracted causal component. Therefore, a component type is determined as "driver".

When matching with all extraction rules is unsuccessful for certain vulnerability information, the causal component extractor 102 may update a registration date and time of the vulnerability information in the vulnerability information storage 101 to the current execution date and time.

The type determiner 104 determines, from a causal component acquired from the causal component extractor 102, a component type of the causal component using the determination rules.

The determination rule storage 105 stores the determination rules. In FIG. 4, an example of the determination rules stored in the determination rules storage 105 is shown. The determination rules include, for example, items of "collation pattern" (second collation pattern), "standard name", and "component type".

The "collation pattern" indicates a pattern for performing matching with the causal component output from the causal component extractor 102. The collation pattern is described using, for example, a regular expression.

The "standard name" indicates a standard name of the causal component. In the vulnerability information stored in the vulnerability information storage 101, a plurality of names may be used for the same component (description fluctuation or misused characters are present). Therefore, it is necessary to unify a name of a component to a standard name.

The "standard name" represents, when the collation pattern matches a certain causal component, a portion representing a standard name in the causal component. When the standard name is indicated as "$n" (n=1, 2, 3 . . . ), the standard name indicates an n-th component from the front in a portion surrounded by round brackets included in the collation pattern. Alternatively, for example, as in a determination rule 5 shown in FIG. 4, a "standard name" may be directly used as the standard name (in this case, "DDDD" is the standard name).

The "component type" indicates a component type of the matched causal component.

The determination rules stored in the determination rule storage 105 may be updated based on, for example, the vulnerability information on the vulnerability information site. Alternatively, new determination rules may be manually added by the user.

The type determiner 104 acquires one determination rule stored in the determination rule storage 105, performs matching with an acquired causal component, and performs typing (classification) of the causal component. As an example, it is assumed that the type determiner 104 performs matching with a causal component (a causal component B) extracted by the extraction rule 1 shown in FIG. 3. When the matching is unsuccessful, the type determiner 104 acquires unselected (unmatched) another determination rule and performs the matching again. Unselected means that a determination rule is unselected for the causal component B.

In this case, the causal component B matches a collation pattern of a determination rule 3 (see FIG. 4). "DAB" corresponds to a portion surrounded by round brackets of the collation pattern of the determination rule 3. Since the "standard name" of the determination rule 3 is "$1", the "DAB" is determined (extracted) as the standard name. Since the "component type" of the determination rule 3 is "service", the component type is determined as the "service".

When a component type of the causal component is already determined based on the extraction rules at a point in time before the matching, the type determiner 104 performs only the determination of the standard name.

When matching with all the determination rules is unsuccessful for a certain causal component, the type determiner 104 may update a registration date and time of vulnerability information from which the causal component is extracted in the vulnerability information storage 101 to the current execution date and time. Alternatively, the type determiner 104 may instruct the causal component extractor 102 to update the registration date and time of the vulnerability information to the current execution date and time and to store the registration date and time in the vulnerability information storage 101.

The type determiner 104 stores, in the causal component storage 106, vulnerability information (a vulnerability ID) of the causal component acquired from the causal component extractor 102 and a standard name and a component type of the causal component.

The causal component storage 106 stores information concerning a causal component of vulnerability (causal component information).

FIG. 5 is a diagram showing an example of the causal component information stored in the causal component storage 106. The causal component information includes, for example, items of "vulnerability ID", "standard name", and "component type".

The "vulnerability ID" indicates a vulnerability ID of vulnerability information corresponding to a causal component output by the type determiner 104. The vulnerability ID of the causal component information is common to the vulnerability ID of the vulnerability information recorded in the vulnerability information storage 101.

The "standard name" indicates a standard name of the causal component. The "component type" indicates a type of the causal component.

For example, causal component information (referred to as causal component information B) obtained from the causal component B is stored in a first row of FIG. 5.

The matching processor 107 performs matching of information (configuration information) indicating software included in a system or a product set as an investigation target of vulnerability stored in the configuration information storage 108 and the vulnerability information stored in the vulnerability information storage 101. The matching processor 107 determines whether software described in the vulnerability information is loaded on the investigation target system. When determining that the software is loaded on the system, the matching processor 107 outputs the vulnerability information to the output processor 109.

The configuration information storage 108 stores the configuration information.

FIG. 6 is a diagram showing an example of the configuration information stored in the configuration information storage 108. The configuration information includes, for example, items of "configuration number", "loading equipment name", "software name", "version", "software identifier", and "check date and time".

The "configuration number" indicates a number (an identifier) for uniquely identifying certain configuration information. One unique configuration number is allocated to one piece of configuration information.

The "loading equipment name" indicates a name of equipment on which software indicated by the configuration information is loaded.

The "software name" indicates a name of the software indicated by the configuration information.

The "version" indicates information concerning a version of the software indicated by the configuration information.

The "software identifier" indicates an identifier of the software indicated by the configuration information. As the "software identifier", the same format (CPE) as the "software identifier" stored in the vulnerability information storage 101 is used.

The "check date and time" indicates a date and time when matching of the configuration information and the vulnerability information recorded in the vulnerability information storage 101 (that is, check about whether vulnerability is likely to be included in the software indicated by the configuration information) is implemented last.

For example, configuration information represented by a configuration number 00001 (hereinafter referred to as configuration information C) indicates a version "5.0.1" of software "aaa OS" loaded on equipment "XXX01". It is seen that the configuration information C is represented as a software identifier "cpe:/o:mmm:aaa:" and the last check was performed at 12:34:56 on Apr. 22, 2022.

The matching processor 107 determines whether there is vulnerability information matching one piece of configuration information. The matching is regarded as successful when the configuration information and a software identifier of vulnerability information coincide and a version of the configuration information satisfies a version condition of the vulnerability information.

For example, when the matching processor 107 performs matching of the configuration information C and the vulnerability information A, the matching is successful because software identifiers of the configuration information C and the vulnerability information A are the same and a version of the configuration information C satisfies a version condition of the vulnerability information A. The matching processor 107 determines that (software including) vulnerability is included in the equipment "XXX01". The matching processor 107 outputs the vulnerability information A and the configuration information C to the output processor 109.

When the CPE is used as the software identifier and granularities of the software identifiers of the vulnerability information and the configuration information are different, the matching processor 107 performs the matching by equalizing the granularities of both the software identifiers. For example, when version information (a version or a version condition) is not included in one software identifier, the matching processor 107 performs the matching without considering version information.

When vulnerability information matching acquired one piece of configuration information is absent, the matching processor 107 may update a check date and time of the configuration information in the configuration information storage 108 to the current execution date and time.

The output processor 109 specifies an investigation procedure for vulnerability using investigation procedure information from a component type corresponding to the vulnerability information received from the matching processor 107 and the vulnerability information stored in the causal component storage 106 and outputs vulnerability investigation information. The output processor 109 may display the vulnerability investigation information on, for example, a Web browser or may notify the vulnerability investigation information to the user using a mail or the like.

The investigation procedure storage 110 stores the investigation procedure information.

FIG. 7 is a diagram showing an example of the investigation procedure information. The investigation procedure information includes, for example, items of "component type", "software identifier", and "investigation procedure".

The "component type" is a component type of a causal component set as a target examined by a certain investigation procedure.

The "software identifier" is an identifier of the software. An investigation procedure is different for each of component types and software identifiers.

The "investigation procedure" indicates a method of specifically examining whether a causal component is included in the software. A section [component] shown in FIG. 7 is substituted with a name (a standard name) of a causal component when being output.

For example, the output processor 109 receives the vulnerability information A (a first row of FIG. 2) and the configuration information C (a first row of FIG. 6) from the matching processor 107. The output processor 109 acquires, from the causal component storage 106, the causal component information B (a first row of FIG. 5) having the same vulnerability ID as the vulnerability ID included in the vulnerability information A and specifies that a component type of a causal component of vulnerability indicated by the vulnerability information A is the "service".

The output processor 109 specifies, out of the investigation procedure information stored in the investigation procedure storage 110, investigation procedure information (referred to as investigation procedure information D) in which a component type is the "service" and a software identifier is the same as a software identifier of the vulnerability information A. The investigation procedure information D is shown in a first row of FIG. 7.

FIG. 8 is a diagram showing an example of vulnerability investigation information output by the output processor 109. The vulnerability investigation information includes, for example, items of "product", "vulnerability", and "investigation procedure". For example, the "product" in FIG. 8 corresponds to the equipment on which the software indicated by the configuration information C is loaded. The "vulnerability" in FIG. 8 corresponds to the vulnerability content of the vulnerability information A. The "investigation procedure" in FIG. 8 corresponds to the investigation procedure of the investigation procedure information D.

A flow of the user examining the vulnerability indicated by the vulnerability information A is explained with reference to FIG. 8 using the investigation procedure information D as an example.

First, the user grasps that vulnerability is included in the product (equipment) "XXX01". Subsequently, the user grasps that vulnerability is included in the DAB service included in the aaa OS. Subsequently, the user logs in to the equipment "XXX01" and executes a command "Get-Service". Then, all services loaded on the aaa OS are output. When the "DAB" is absent in the output or when the "DAB" is present but a start mode of the DAB" is other than "Auto" and "Enable", the user determines that security is high. When the start mode is the "Auto" or the "Enable", the user determines that security is low.

In this way, referring to FIG. 8, the user can learn that the vulnerability indicated by the vulnerability information A is likely to be included in the software indicated by the configuration information C loaded on an investigation target system or product and learn content of the vulnerability and a specific investigation procedure for the vulnerability.

When an investigation procedure is not successfully specified, the output processor 109 outputs vulnerability investigation information other than the investigation procedure as shown in FIG. 9.

Subsequently, an operation of the information processing apparatus 100 is explained.

Figure 10:
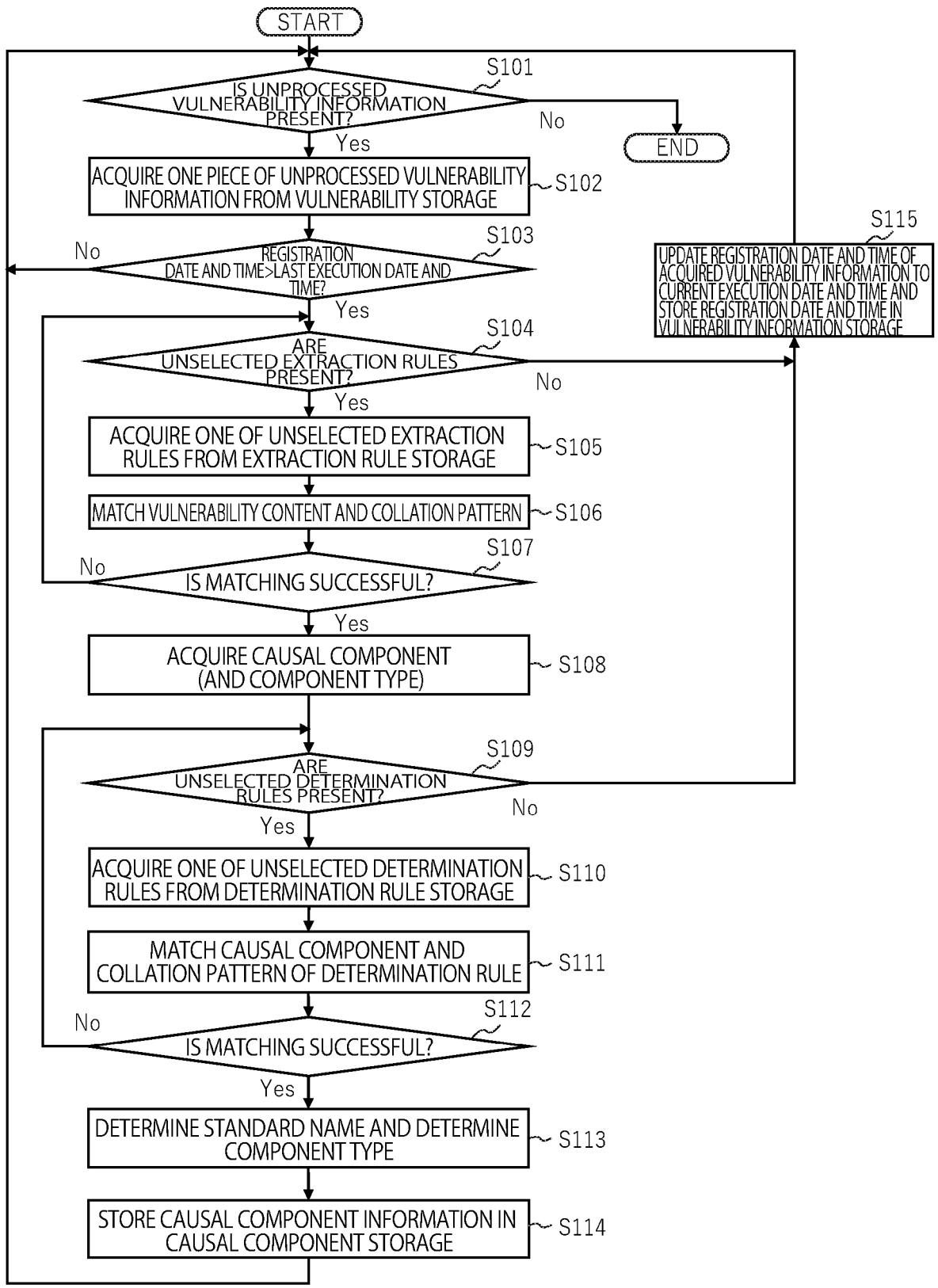
FIG. 10 is a flowchart for explaining an operation in a first phase.

FIG. 10 is a flowchart showing an example of the first phase performed by the information processing apparatus 100. The first phase is explained below with reference to FIG. 10. The first phase may be started at a point in time when new vulnerability information is acquired and stored in the vulnerability information storage 101 or may be started at specific time.

First, the causal component extractor 102 determines whether unprocessed vulnerability information is present among the vulnerability information (see FIG. 2) stored in the vulnerability information storage 101 (step S101).

When unprocessed vulnerability information is absent (all pieces of vulnerability information have been processed), the information processing apparatus 100 ends processing of the first phase (No in step S101).

When unprocessed vulnerability information is present, the information processing apparatus 100 shifts to step S102 (Yes in step S101).

Subsequently, the causal component extractor 102 acquires one piece of the unprocessed vulnerability information (see FIG. 2) stored in the vulnerability information storage 101 (step S102).

Subsequently in order to prevent the same processing from being executed again, the causal component extractor 102 compares "registration date and time" included in the acquired vulnerability information and an execution date and time at the last first phase (step S103).

When the "registration date and time" is earlier, the information processing apparatus 100 returns to step S101 and selects another piece of vulnerability information (No in step S103).

When the execution date and time at the last first phase is earlier, the information processing apparatus 100 shifts to step S104 (Yes in step S103).

Subsequently, the causal component extractor 102 determines whether extraction rules unselected for the acquired one piece of vulnerability information are stored in the extraction rule storage 103 (step S104).

When it is determined that unselected extraction rules are not stored in the extraction rule storage 103 (matching the acquired one piece of vulnerability information with all the extraction rules is unsuccessful), the information processing apparatus 100 shifts to step S115 (No in step S104).

Subsequently, the causal component extractor 102 updates a registration date and time of the acquired one piece of vulnerability information to the current execution date and time and stores the registration date and time in the vulnerability information storage 101 (step S115). Thereafter, the information processing apparatus 100 returns to step S101 and selects another vulnerability information.

When it is determined that unselected extraction rules are stored in the extraction rule storage 103, the information processing apparatus 100 shifts to step S105 (Yes in step S104).

Subsequently, the causal component extractor 102 acquires one of the unselected extraction rules (see FIG. 3) stored in the extraction rule storage 103 (step S105).

Subsequently, the causal component extractor 102 matches a collation pattern of the acquired extraction rule with vulnerability content included in the acquired vulnerability information (step S106).

Subsequently, the causal component extractor 102 determines whether the matching is successful (step S107).

When the matching is unsuccessful, the information processing apparatus 100 returns to step S104 and selects another extraction rule (No in step S107).

When the matching is successful, the information processing apparatus 100 shifts to step S108 (Yes in step S107).

Subsequently, the causal component extractor 102 acquires, based on the extraction rules, a causal component (and a component type) from the acquired vulnerability information (step S108).

Subsequently, the type determiner 104 determines whether unselected determination rules (see FIG. 4) are stored in the determination rule storage 105 (step S109).

When unselected determination rules are not stored in the determination rule storage 105 (matching with all the determination rules is unsuccessful), the information processing apparatus 100 shifts to step S115 (No in step S109).

When unselected determination rules are stored in the determination rule storage 105, the information processing apparatus 100 shifts to step S110 (Yes in step S109).

Subsequently, the information processing apparatus 100 acquires one of the unselected determination rules stored in the determination rule storage 105 (step S110).

Subsequently, the type determiner 104 matches a collation pattern of the acquired determination rule with the acquired causal component (step S111).

Subsequently, the type determiner 104 determines whether the matching is successful (step S112).

When the matching is unsuccessful, the information processing apparatus 100 returns to step S109 and selects another determination rule (No in step S112).

When the matching is successful, the information processing apparatus 100 shifts to step S113 (Yes in step S112).

Subsequently, the type determiner 104 substitutes "standard name" of the acquired causal component with "standard name" of the acquired determination rule. The type determiner 104 determines "component type" of the acquired determination rule as a component type of the acquired causal component (step S113).

Subsequently, the information processing apparatus 100 stores causal component information (see FIG. 5) including the vulnerability ID of the acquired vulnerability information, the standard name of the acquired causal component, and the component type of the acquired causal component in the causal component storage 106 (step S114).

Thereafter, the information processing apparatus 100 returns to step S101 and performs the same processing (steps S101 to S115) for another piece of vulnerability information.

As explained above, the causal component of the vulnerability is specified from the disclosed vulnerability information and the causal component information linked with the vulnerability ID is obtained by the first phase.

Figure 11:
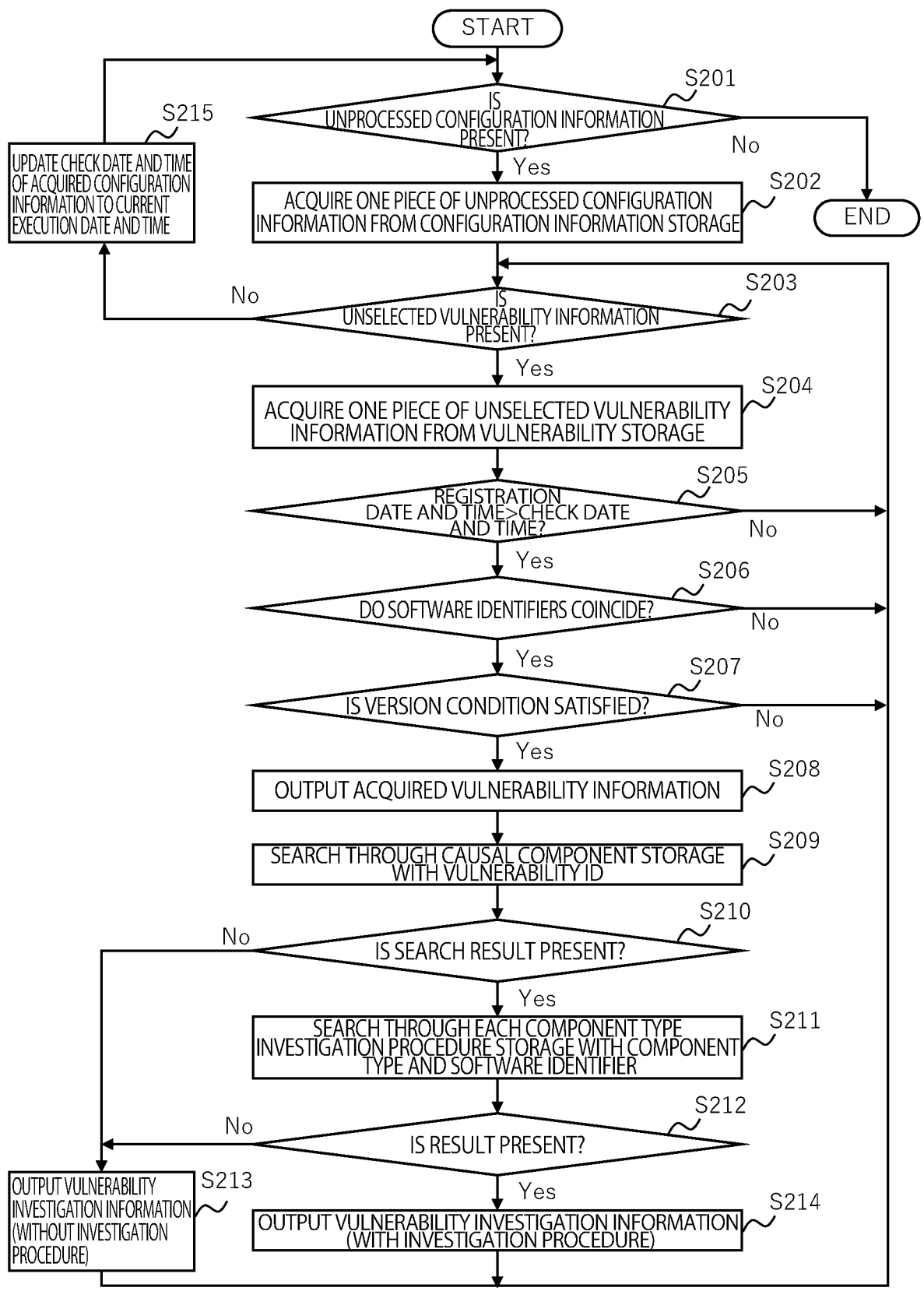
FIG. 11 is a flowchart for explaining an operation in a second phase.

FIG. 11 is a flowchart showing an example of the second phase performed by the information processing apparatus 100. The second phase is explained below with reference to FIG. 11. The second phase is executed at timing based on a point in time when new vulnerability information is registered in the vulnerability information storage 101, a point in time when new configuration information is registered in the configuration information storage 108 or specific time, or a plurality of combinations of points in time.

First, the matching processor 107 determines whether unprocessed configuration information is present among the configuration information stored in the configuration information storage 108 (step S201).

When all the pieces of configuration information stored in the configuration information storage 108 have been processed, the information processing apparatus 100 ends the second phase (No in step S201).

When unprocessed configuration information is included in the configuration information stored in the configuration information storage 108, the information processing apparatus 100 shifts to step S202 (Yes in step S201).

Subsequently, the matching processor 107 extracts one piece of the unprocessed configuration information stored in the configuration information storage 108 (step S202).

Subsequently, the matching processor 107 determines whether unselected vulnerability information is stored for the acquired configuration information in the vulnerability information storage 101 (step S203).

When unselected vulnerability information is not stored in the vulnerability information storage 101 (all the pieces of vulnerability information do not match the acquired configuration information), the information processing apparatus 100 shifts to step S215 (No in step S203).

Subsequently, the information processing apparatus 100 sets, in the configuration information storage 108, a current execution date and time as "check date and time" of the acquired configuration information (step S215), returns to step S201, and acquires another piece of configuration information.

When unprocessed vulnerability information is stored in the vulnerability information storage 101, the information processing apparatus 100 shifts to step S204 (Yes in step S203).

Subsequently, the matching processor 107 acquires one piece of the unselected vulnerability information stored in the vulnerability information storage 101 (step S204).

Subsequently, the matching processor 107 compares "registration date and time" of the acquired vulnerability information and the "check date and time" of the acquired configuration information (step S205).

If the "registration date and time" is earlier, the information processing apparatus 100 returns to step S203 (No in step S205) and selects another piece of vulnerability information.

If the "check date and time" is earlier, the information processing apparatus 100 shifts to step S206 (Yes in step S205).

Subsequently, the matching processor 107 determines whether "software identifier" of the acquired vulnerability information and "software identifier" of the acquired configuration information coincide (step S206).

If the software identifiers do not coincide, the information processing apparatus 100 returns to step S203 (No in step S206) and selects another piece of vulnerability information.

If the software identifiers coincide, the information processing apparatus 100 shifts to step S207 (Yes in step S206).

Subsequently, the matching processor 107 determines whether "version" of the acquired configuration information satisfies "version condition" of the acquired vulnerability information (step S207).

When the "version" of the acquired configuration information does not satisfy the "version condition" of the acquired vulnerability information, the information processing apparatus 100 returns to step S203 (No in step S207) and selects another piece of vulnerability information.

When the "version" of the acquired configuration information satisfies the "version condition" of the acquired vulnerability information, the information processing apparatus 100 shifts to step S208 (Yes in step S207).

Subsequently, the matching processor 107 outputs the acquired vulnerability information and the acquired configuration information to the output processor 109 (step S208).

Subsequently, the output processor 109 searches for, in the causal component storage 106, causal component information including a vulnerability ID coinciding with a vulnerability ID of the vulnerability information received from the matching processor 107 (step S209).

Subsequently, the output processor 109 determines whether a search result in step S209 is present (step S210).

When the search result is absent, the information processing apparatus 100 shifts to step S213 (No in step S210).

Subsequently, the output processor 109 outputs, based on the configuration information and the vulnerability information received from the matching processor 107, a product or a system including vulnerability and content of the vulnerability (step S213).

When the search result is present, the information processing apparatus 100 shifts to step S211 (Yes in step S210).

Subsequently, the output processor 109 searches for, in the investigation procedure storage 110, investigation procedure information including a component type coinciding with a component type of the causal component information obtained as a result of the search and including a software identifier coinciding with a software identifier of the acquired vulnerability information (step S211).

Subsequently, the output processor 109 determines whether a result of the search in step S210 is present (step S212).

When the search result is absent, the information processing apparatus 100 shifts to step S213 (No in step S212).

When the search result is present, the information processing apparatus 100 shifts to step S214 (Yes in step S212).

Subsequently, the output processor 109 substitutes a section [component] in an investigation procedure of the investigation procedure information obtained as a result of the search with a standard name of the acquired causal component information and outputs the investigation procedure after the substitution together with the product or the system including the vulnerability and the content of the vulnerability (step S214). The information processing apparatus 100 returns to step S103.

As explained above, with the second phase, it is possible to determine whether vulnerability is included in a system or a product that is a vulnerability determination target. It is possible to output vulnerability investigation information including a specific investigation procedure for vulnerability.

As explained above, according to the first embodiment, by specifying, from disclosed vulnerability information for which investigation is necessary, a component type of a causal component of vulnerability indicated by the vulnerability information, it is possible to output vulnerability investigation information including a specific investigation procedure for the vulnerability. Therefore, the user does not need to analyze the disclosed vulnerability information and determine an appropriate investigation procedure for security determination. Therefore, it is possible to greatly reduce a burden on the user.

Second Embodiment

In the first embodiment, all the detected vulnerabilities are notified to the user. However, actually, not all of the detected vulnerabilities are problems. Vulnerability sometimes does not appear, for example, when, like a driver of an OS, software does not have corresponding hardware or when software is not enabled as a feature of the OS itself.

In view of the circumstances described above, an object of a second embodiment is to further reduce a burden on a user by, when software is an OS, automatically determining, based on setting information of the OS, software that is not started.

Figure 12:
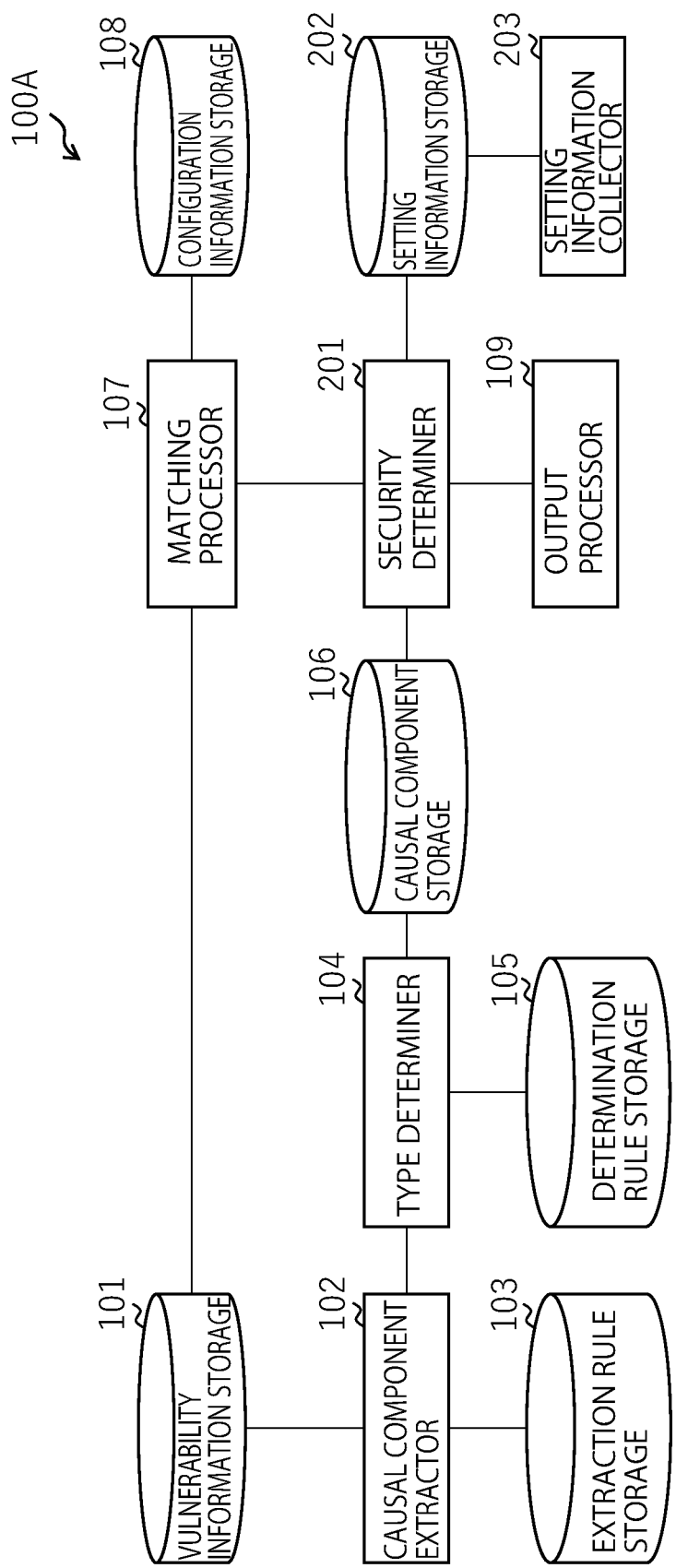
FIG. 12 is a block diagram showing an information processing apparatus according to a second embodiment.

FIG. 12 is a block diagram of an information processing apparatus 100A according to this embodiment. Components having the same names or features as the names or the functions of the components shown in FIG. 1 in the first embodiment are denoted by the same reference numerals. In the following explanation, explanation is omitted except explanation about changed or added matters.

The information processing apparatus 100A specifies a causal component of vulnerability from disclosed vulnerability information (a first phase), collects setting information for a system or a product that is a vulnerability determination target (a third phase), and determines, referring to vulnerability information from configuration information, whether vulnerability is included in the system or the product (a fourth phase).

The information processing apparatus 100A includes, in addition to the blocks 101 to 109, a security determiner 201, a setting information storage 202, and a setting information collector 203. Although not shown, the information processing apparatus 100A may include an investigation procedure storage 110.

First, the security determiner 201 receives matched vulnerability information from the matching processor 107. Subsequently, the security determiner 201 determines security of investigation target software based on a component type corresponding to vulnerability information stored in the causal component storage 106 and setting information of a system or a product (more specifically, setting information of investigation target software) and outputs a result of the determination to the output processor 109.

The setting information storage 202 stores setting information.

FIG. 13 is an example of the setting information stored in the setting information storage 202. The setting information includes, for example, items of "configuration number", "component type", "setting identifier", and "setting value".

The "configuration number" is an identifier of configuration information for specifying the investigation target software. The configuration number is common to a configuration number added to configuration information stored in the configuration information storage 108.

The "component type" indicates a component type of the investigation target software.

The "setting identifier" indicates a name of a setting item (a setting item name) in the investigation target software.

The "setting value" indicates a certain value for the setting item. The setting identifier and the value that can be taken as the setting value are determined by the component type of the investigation target software.

FIG. 14 is an example of a relation between a setting identifier and a setting value for each of component types. For example, when a component type of certain software is the "service" or the "driver" and a setting value of the software is "OFF", the software is not started. Alternatively, when a component type of certain software is "function" and a setting value of the software is "disable", a part of features of the software is not enabled. Alternatively, when certain software is a specific OS, a component type of the software is "kernel", and a setting value of the software is "0" or "null", a part of features of the specific OS is not enabled.

That is, when the software having the setting value explained above is loaded on equipment, it is highly likely that the software actually does not operate or a feature having vulnerability of the software is disabled. Therefore, vulnerability included in the software is highly likely to be safe.

The setting information collector 203 collects setting information for an investigation target system or product and stores the setting information in the setting information storage 202. Specifically, the setting information collector 203 operates as explained below.

The setting information collector 203 stores, in the setting information storage 202, setting information necessary when a component type is the "service". That is, the setting information collector 203 stores, in the setting information storage 202, start information of all services set in a target OS.

For example, the setting information collector 203 executes a command "Get-Service" and acquires all the services included in the target OS and start modes of the services. The setting information collector 203 sets names of the acquired services in an item (a column) of a setting identifier and, when start modes of the services are "Auto" or "Enable", sets an item (a column) of a setting value to "ON" and, otherwise, sets the item to "OFF" (see FIG. 14).

Similarly, the setting information collector 203 acquires setting information necessary when the component type is the "driver" and setting information necessary when the component type is the "function" and stores the setting information in the setting information storage 202. When the component type is the "driver", the command "Get-Driver" only has to be used for setting information collection.

The setting information collector 203 determines whether target software is a specific OS and, when the target software is the specific OS, acquires setting information necessary when the component type is the "kernel" and stores the setting information in the setting information storage 202.

Subsequently, an operation of the information processing apparatus 100A is explained. Explanation is omitted about the first phase because an operation in the first phase is the same as the operation in the first phase in the first embodiment.

Figure 15:
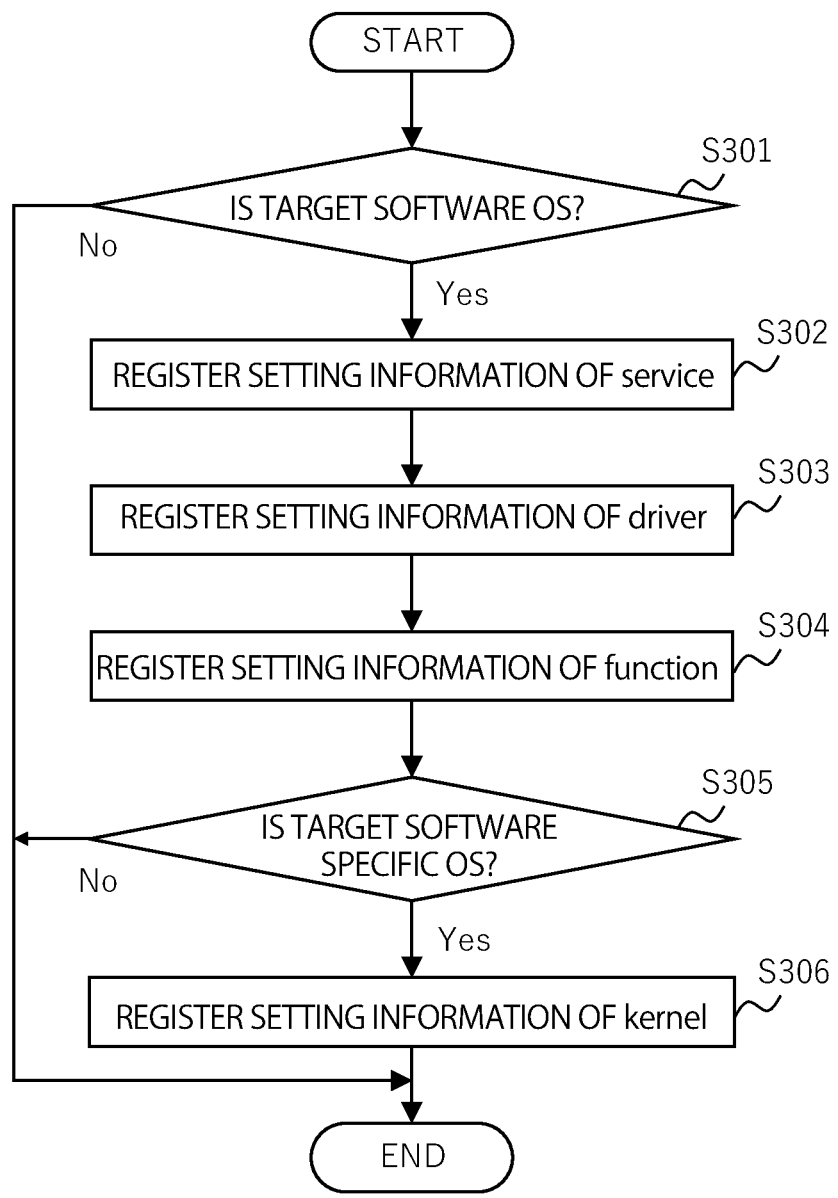
FIG. 15 is a flowchart for explaining an operation in a third phase.

FIG. 15 is a flowchart showing an example of the third phase performed by the setting information collector 203. In the following explanation, the third phase is explained with reference to FIG. 15. The third phase (setting information collection) is performed for each target software.

First, the setting information collector 203 determines, based on a software identifier of a target software, whether the target software is an OS (step S301).

When the target software is an OS, the setting information collector 203 shifts to step 302 (Yes in step S301).

When the target software is not an OS, the setting information collector 203 ends the third phase (No in step S301).

Subsequently, the setting information collector 203 stores, in the setting information storage 202, setting information necessary when a component type is service (step S302).

Subsequently, the setting information collector 203 stores, in the setting information storage 202, setting information necessary when the component type is driver (step S303).

Subsequently, the setting information collector 203 stores, in the setting information storage 202, setting information necessary when the component type is function (step S304).

Subsequently, the setting information collector 203 determines whether the target software is a specific OS (step S305).

When the target software is the specific OS, the setting information collector 203 shifts to step S306 (Yes in step S305).

When the target software is not the specific OS, the setting information collector 203 ends the third phase (No in step S305).

Subsequently, the setting information collector 203 stores, in the setting information storage 202, setting information necessary when the component type is kernel (step S306).

Note that the storage of the setting information in the setting information storage 202 in steps S302, S303, S304, and S306 may be manually performed or may be automatically performed by script or the like. Some OS does not have the target features in steps S302, S303, S304, and S306. Therefore, a part of steps S302, S303, S304, and S306 may be omitted.

Figure 16:
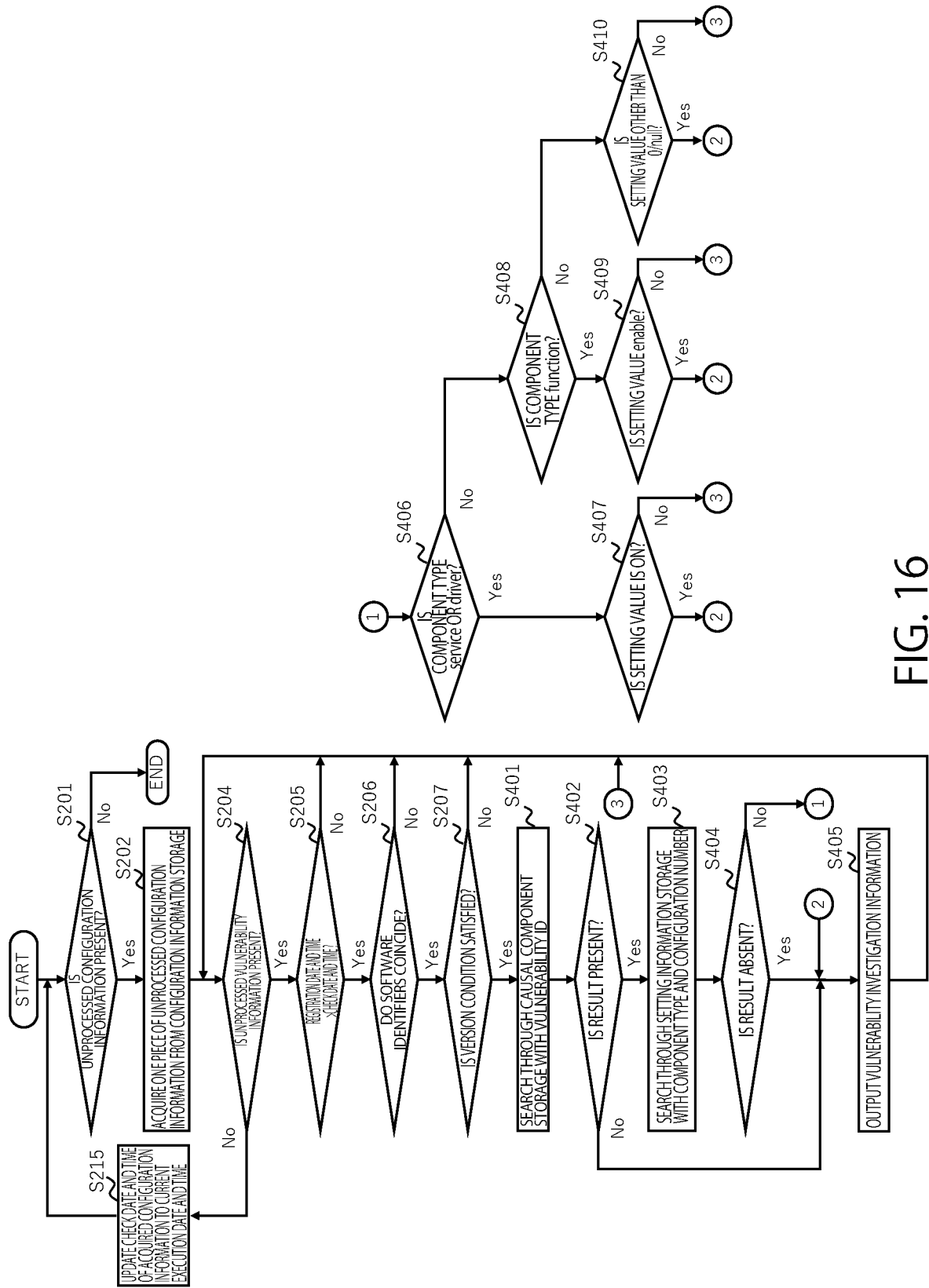
FIG. 16 is a flowchart for explaining an operation in a fourth phase.

FIG. 16 is a flowchart showing an example of the fourth phase. The fourth phase is explained below with reference to FIG. 16. Explanation is omitted about steps S201 to S207 and step S215 because operations in the steps are the same operations as the operations in the second phase.

Subsequently to step S207, the security determiner 201 searches for, in the causal component storage 106, causal component information having a vulnerability ID coinciding with a vulnerability ID of the acquired vulnerability information (step S401).

Subsequently, the security determiner 201 determines whether a result of the search in the step S401 is present (step S402).

When the search result in step S401 is absent, the information processing apparatus 100A shifts to step S405 (No in step S402).

When the search result in step S401 is present, the information processing apparatus 100A shifts to step S403 (Yes in step S402).

Subsequently, the security determiner 201 searches for, in the setting information stored in the setting information storage 202, setting information having the same component type as a component type of the acquired causal component and having the same configuration number as a configuration number of the acquired configuration information (step S403).

Subsequently, the security determiner 201 determines whether a search result in step S403 is present (step S404).

When the search result in step S403 is present, the information processing apparatus 100A shifts to step S406 (No in step S404) and determines security of target software with steps S406 to S410.

Subsequently, the security determiner 201 determines whether the component type of the acquired causal component is the "service" or the "driver" (step S406).

When the component type of the acquired causal component is the "service" or the "driver" (Yes in step S406), the security determiner 201 determines whether a setting value is "ON" (step S407).

When the setting value is "ON", the information processing apparatus 100A shifts to step S405 (Yes in step S407). When the setting value is "OFF", the information processing apparatus 100A returns to step S204 (No in step S407) and selects another vulnerability. The setting value being "ON" corresponds to a case in which relevant vulnerability is present in the target software. The setting value being "OFF" corresponds to a case in which the relevant vulnerability is absent in the target software.

When the component type of the acquired causal component is other than the "service" or the "driver" (No in step S406), the security determiner 201 determines whether the component type of the acquired causal component is the "function" (step S408).

When the component type of the acquired causal component is the "function" (Yes in step S408), the security determiner 201 determines whether the setting value is "enable" (step S409).

When the setting value is the "enable", the information processing apparatus 100A shifts to step S405 (Yes in step S409). When the setting value is "disable", the information processing apparatus 100A returns to step S204 (No in step S407) and selects another vulnerability. The setting value being the "enable" corresponds to a case in which relevant vulnerability is present in the target software. The setting value being the "disable" corresponds to a case in which the relevant vulnerability is absent in the target software.

When the component type of the acquired causal component is the "kernel" (No in step S408), the security determiner 201 determines whether the setting value is other than "0" and "null" (step S410).

When the setting value is other than "0" and "null", the information processing apparatus 100A shifts to step S405 (Yes in step S410). When the setting value is "0" or "null" (No in step S410), the information processing apparatus 100A returns to step S204 and selects another vulnerability. The setting value being other than "0" and "null" corresponds to a case in which relevant vulnerability is present in the target software. The setting value being "0" or "null" corresponds to a case in which the relevant vulnerability is absent in the target software.

When the search result in step S403 is absent, the information processing apparatus 100A shifts to step S405 (Yes in step S404).

Subsequently, the security determiner 201 outputs, based on the configuration information and the vulnerability information received from the matching processor 107, a product or a system including vulnerability and content of the vulnerability to the output processor 109. The output processor 109 outputs vulnerability investigation information based on the information received from the security determiner 201 in order to notify the vulnerability investigation information to the user (step S405). For example, the output processor 109 outputs the vulnerability investigation information (the information indicating the presence of the vulnerability) shown in FIG. 9.

Note that, in this embodiment, when it is determined No in steps S407, S409, and S410, the user is not notified because security is high. However, it may be notified to the user that security is high.

As explained above, according to this embodiment, when vulnerability investigation target software is an OS, it is possible to partially automate investigation of security of vulnerability based on setting information of the OS. Therefore, it is possible to further reduce a burden on the user by using this embodiment.

In the first embodiment and the second embodiment, the component types are limited to the four component types of the "service", the "driver", the "function", and the "kernel" concerning the OS. However, component types may be further added. For example, by designating a specific application as a component type and using a setting file of the specific application as setting information, it is possible to reduce a burden on the user for security determination not only for the OS but also for a wide range of software.

(Hardware Configuration)

Figure 17:
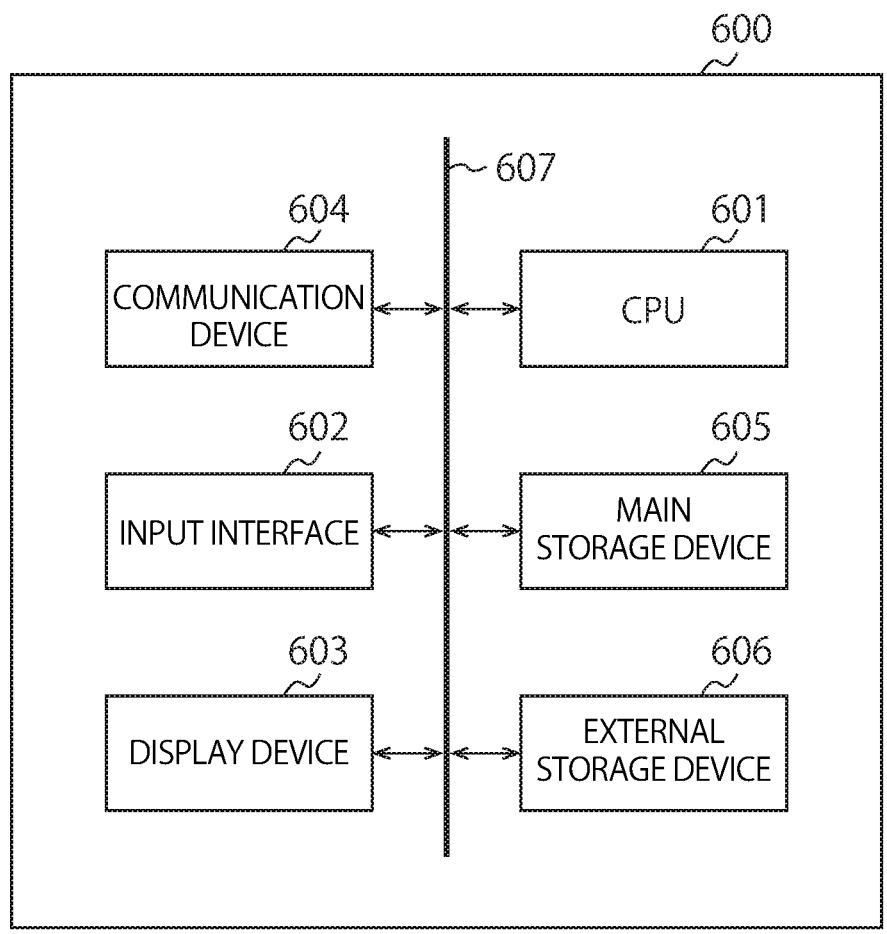
FIG. 17 is a diagram showing a hardware configuration of the information processing apparatuses according to the embodiments.

FIG. 17 illustrates a hardware configuration of the information processing device according to each embodiment. The information processing device is configured as a computer device 600. The computer device 600 includes a CPU 601, an input interface 602, a display device 603, a communication device 604, a main storage device 605, and an external storage device 606, and these components are mutually connected through a bus 607.

The CPU (central processing unit) 601 executes an information processing program as a computer program on the main storage device 605. The information processing program is a computer program configured to achieve each above-described functional composition of the present device. The information processing program may be achieved by a combination of a plurality of computer programs and scripts instead of one computer program. Each functional composition is achieved as the CPU 601 executes the information processing program.

The input interface 602 is a circuit for inputting, to the present device, an operation signal from an input device such as a keyboard, a mouse, or a touch panel. The input interface 602 corresponds to the input device in each embodiment.

The display device 603 displays data output from the present device. The display device 603 is, for example, a liquid crystal display (LCD), an organic electroluminescence display, a cathode-ray tube (CRT), or a plasma display (PDP) but is not limited thereto. Data output from the computer device 600 can be displayed on the display device 603. The display device 603 corresponds to the output device in each embodiment.

The communication device 604 is a circuit for the present device to communicate with an external device in a wireless or wired manner. Data can be input from the external device through the communication device 604. The data input from the external device can be stored in the main storage device 605 or the external storage device 606.

The main storage device 605 stores, for example, the information processing program, data necessary for execution of the information processing program, and data generated through execution of the information processing program. The information processing program is loaded and executed on the main storage device 605. The main storage device 605 is, for example, a RAM, a DRAM, or an SRAM but is not limited thereto. Each storage or database in the information processing device in each embodiment may be implemented on the main storage device 605.

The external storage device 606 stores, for example, the information processing program, data necessary for execution of the information processing program, and data generated through execution of the information processing program. The information processing program and the data are read onto the main storage device 605 at execution of the information processing program. The external storage device 606 is, for example, a hard disk, an optical disk, a flash memory, or a magnetic tape but is not limited thereto. Each storage or database in the information processing device in each embodiment may be implemented on the external storage device 606.

The information processing program may be installed on the computer device 600 in advance or may be stored in a storage medium such as a CD-ROM. Moreover, the information processing program in each embodiment may be uploaded on the Internet.

The present device may be configured as a single computer device 600 or may be configured as a system including a plurality of mutually connected computer devices 600.

While certain embodiment have been described, these embodiment have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described before may be configured as below.

CLAUSES

Clause 1. An information processing apparatus comprising:
a vulnerability database in which one or more pieces of vulnerability information are stored, the vulnerability information including a vulnerability identifier for uniquely specifying vulnerability, a software identifier for uniquely specifying software including the vulnerability, and vulnerability description indicating content of the vulnerability;

a matching processor configured to specify, in the vulnerability database, vulnerability information matching a software identifier of a target software provided in target equipment;

a causal component specifier configured to specify, from the vulnerability description in the vulnerability information specified by the matching processor, a causal component that is a cause of the vulnerability;

a type determiner configured to determine a type of the causal component from a name of the specified causal component; and an output processor configured to determine, based on the software identifier of the target software and the type of the causal component, an investigation procedure concerning vulnerability of the target software and output information indicating the investigation procedure.

Clause 2. The information processing apparatus according to clause 1, wherein the causal component specifier specifies, for each piece of the vulnerability information in the vulnerability database, from the vulnerability description, the causal component that is the cause of the vulnerability, the type determiner determines the type of the causal component from a name of the specified causal component and stores, in a causal component database, causal component information including the vulnerability identifier of the vulnerability information and the type of the causal component, and the output processor specifies, in the causal component database, a type of the causal component matching the vulnerability identifier included in the vulnerability information specified by the matching processor and determines the investigation procedure based on the software identifier of the target software and the type of the specified causal component.

Clause 3. The information processing apparatus according to clause 1 or 2, wherein the vulnerability information in the vulnerability database includes a version condition for the software, and the matching processor specifies vulnerability information in which a software identifier matches the software identifier of the target software and a version of the target software satisfies the version condition.

Clause 4. The information processing apparatus according to any one of clauses 1 to 3, further comprising an investigation procedure database in which investigation procedure information including the type of the causal component, the software identifier, and investigation procedure description indicating content of the investigation procedure and including a name of the causal component as a variable is stored, wherein the output processor specifies the investigation procedure information matching the software identifier of the target software and the type of the causal component determined by the type determiner, substitutes the variable in the investigation procedure description of the specified investigation procedure information with the name of the causal component specified by the causal component specifier, and outputs, as information indicating the investigation procedure, the information including the investigation procedure description after the substitution.

Clause 5. The information processing apparatus according to any one of clauses 1 to 4, wherein the causal component specifier applies one or more first collation patterns to the vulnerability description to specify a matching first collation pattern, extracts, from the vulnerability description, a description portion in a part designated by the specified first collation pattern, and sets a target indicated by the extracted description portion as the causal component.

Clause 6. The information processing apparatus according to clause 5, wherein the type determiner applies one or more second collation patterns respectively associated with causal component types to the extracted description portion to specify a matching second collation pattern and determines, as the type of the causal component, the causal component type corresponding to the specified second collation pattern.

Clause 7. The information processing apparatus according to clause 6, wherein the type determiner extracts, from the extracted description portion, a description portion in a part designated by the specified second collation pattern and sets, as a standard name of the causal component, a target indicated by the extracted description portion, and the information indicating the investigation procedure includes the standard name of the causal component.

Clause 8. The information processing apparatus according to any one of clauses 1 to 7, further comprising a security determiner configured to acquire a setting value of a setting item of the causal component specified by the causal component specifier for the target software and determine, based on the setting value, security against the vulnerability of the target software, wherein the output processor outputs, based on a determination result of the security determiner, information indicating presence of the vulnerability.

Clause 9. The information processing apparatus according to any one of clauses 1 to 8, wherein the target software is an OS (Operating System).

Clause 10. An information processing method comprising:

accessing a vulnerability database in which one or more pieces of vulnerability information are stored,
the vulnerability information including
a vulnerability identifier for uniquely specifying vulnerability,
a software identifier for uniquely specifying software including the vulnerability, and
vulnerability description indicating content of the vulnerability;

specifying vulnerability information matching a software identifier of a target software provided in target equipment;

specifying, from the vulnerability description in the vulnerability information specified, a causal component that is a cause of the vulnerability;

determining a type of the causal component from a name of the specified causal component; and determining, based on the software identifier of the target software and the type of the causal component, an investigation procedure concerning vulnerability of the target software; and outputting information indicating the investigation procedure.

Clause 11. A non-transitory computer readable medium having a computer program stored therein which causes a computer to perform processes comprising:

accessing a vulnerability database in which one or more pieces of vulnerability information are stored,
the vulnerability information including
a vulnerability identifier for uniquely specifying vulnerability,
a software identifier for uniquely specifying software including the vulnerability, and vulnerability description indicating content of the vulnerability;

specifying vulnerability information matching a software identifier of a target software provided in target equipment;

specifying, from the vulnerability description in the vulnerability information specified, a causal component that is a cause of the vulnerability;

determining a type of the causal component from a name of the specified causal component; and determining, based on the software identifier of the target software and the type of the causal component, an investigation procedure concerning vulnerability of the target software; and outputting information indicating the investigation procedure.

The invention claimed is:

1. An information processing apparatus comprising:
a vulnerability database in which one or more pieces of vulnerability information are stored, the vulnerability information including
a vulnerability identifier for uniquely specifying vulnerability,
a software identifier for uniquely specifying software including the vulnerability, and
vulnerability description indicating content of the vulnerability;
a processing circuitry including
a matching processor configured to specify, in the vulnerability database, vulnerability information matching a software identifier of a target software provided in target equipment;
a causal component specifier configured to specify, from the vulnerability description in the vulnerability information specified by the matching processor, a causal component that is a cause of the vulnerability;
a type determiner configured to determine a type of the causal component from a name of the specified causal component; and
an output processor configured to determine, based on the software identifier of the target software and the type of the causal component, an investigation procedure concerning vulnerability of the target software and output information indicating the investigation procedure,
wherein
the causal component specifier specifies, for each piece of the vulnerability information in the vulnerability database, from the vulnerability description, the causal component that is the cause of the vulnerability,
the type determiner determines the type of the causal component from a name of the specified causal component and stores, in a causal component database, causal component information including the vulnerability identifier of the vulnerability information and the type of the causal component, and
the output processor specifies, in the causal component database, a type of the causal component matching the vulnerability identifier included in the vulnerability information specified by the matching processor and determines the investigation procedure based on the software identifier of the target software and the type of the specified causal component.

2. The information processing apparatus according to claim 1, wherein the vulnerability information in the vulnerability database includes a version condition for the software, and the matching processor specifies vulnerability information in which a software identifier matches the software identifier of the target software and a version of the target software satisfies the version condition.

3. The information processing apparatus according to claim 1, further comprising an investigation procedure database in which investigation procedure information including the type of the causal component, the software identifier, and investigation procedure description indicating content of the investigation procedure and including a name of the causal component as a variable is stored, wherein the output processor specifies the investigation procedure information matching the software identifier of the target software and the type of the causal component determined by the type determiner, substitutes the variable in the investigation procedure description of the specified investigation procedure information with the name of the causal component specified by the causal component specifier, and outputs, as information indicating the investigation procedure, the information including the investigation procedure description after the substitution.

4. The information processing apparatus according to claim 1, wherein the causal component specifier applies one or more first collation patterns to the vulnerability description to specify a matching first collation pattern, extracts, from the vulnerability description, a description portion in a part designated by the specified first collation pattern, and sets a target indicated by the extracted description portion as the causal component.

5. The information processing apparatus according to claim 4, wherein the type determiner applies one or more second collation patterns respectively associated with causal component types to the extracted description portion to specify a matching second collation pattern and determines, as the type of the causal component, the causal component type corresponding to the specified second collation pattern.

6. The information processing apparatus according to claim 5, wherein the type determiner extracts, from the extracted description portion, a description portion in a part designated by the specified second collation pattern and sets, as a standard name of the causal component, a target indicated by the extracted description portion, and the information indicating the investigation procedure includes the standard name of the causal component.

7. The information processing apparatus according to claim 1, wherein the processing circuitry further includes a security determiner configured to acquire a setting value of a setting item of the causal component specified by the causal component specifier for the target software and determine, based on the setting value, security against the vulnerability of the target software, wherein the output processor outputs, based on a determination result of the security determiner, information indicating presence of the vulnerability.

8. The information processing apparatus according to claim 1, wherein the target software is an OS (Operating System).

9. An information processing method comprising:
accessing a vulnerability database in which one or more pieces of vulnerability information are stored,
the vulnerability information including
a vulnerability identifier for uniquely specifying vulnerability, a software identifier for uniquely specifying software including the vulnerability, and vulnerability description indicating content of the vulnerability;

specifying vulnerability information matching a software identifier of a target software provided in target equipment;

specifying, from the vulnerability description in the vulnerability information specified, a causal component that is a cause of the vulnerability;

determining a type of the causal component from a name of the specified causal component; and determining, based on the software identifier of the target software and the type of the causal component, an investigation procedure concerning vulnerability of the target software; and outputting information indicating the investigation procedure, wherein the method further comprises:

specifying, for each piece of the vulnerability information in the vulnerability database, from the vulnerability description, the causal component that is the cause of the vulnerability, determining the type of the causal component from a name of the specified causal component and storing, in a causal component database, causal component information including the vulnerability identifier of the vulnerability information and the type of the causal component, and specifying, in the causal component database, a type of the causal component matching the vulnerability identifier included in the vulnerability information specified and determining the investigation procedure based on the software identifier of the target software and the type of the specified causal component.

10. A non-transitory computer readable medium having a computer program stored therein which causes a computer to perform processes comprising:

accessing a vulnerability database in which one or more pieces of vulnerability information are stored, the vulnerability information including a vulnerability identifier for uniquely specifying vulnerability, a software identifier for uniquely specifying software including the vulnerability, and vulnerability description indicating content of the vulnerability;

specifying vulnerability information matching a software identifier of a target software provided in target equipment;

specifying, from the vulnerability description in the vulnerability information specified, a causal component that is a cause of the vulnerability;

determining a type of the causal component from a name of the specified causal component; and determining, based on the software identifier of the target software and the type of the causal component, an investigation procedure concerning vulnerability of the target software; and outputting information indicating the investigation procedure, wherein the processes further comprise:

specifying, for each piece of the vulnerability information in the vulnerability database, from the vulnerability description, the causal component that is the cause of the vulnerability, determining the type of the causal component from a name of the specified causal component and storing, in a causal component database, causal component information including the vulnerability identifier of the vulnerability information and the type of the causal component, and specifying, in the causal component database, a type of the causal component matching the vulnerability identifier included in the vulnerability information specified and determining the investigation procedure based on the software identifier of the target software and the type of the specified causal component.

* * * * *